(12) United States Patent
Timms et al.

(10) Patent No.: US 12,725,734 B2
(45) Date of Patent: Sep. 1, 2026

(54) METHOD OF MAKING A CAPACITOR

(71) Applicant: Saras Micro Devices, Inc., Atlanta, GA (US)

(72) Inventors: Courtney Timms, Atlanta, GA (US); Jose Solis Martinez, Atlanta, GA (US)

(73) Assignee: Saras Micro Devices, Inc., Chandler, AZ (US)

( * ) Notice: Subject to any disclaimer, the term of this patent is extended or adjusted under 35 U.S.C. 154(b) by 286 days.

(21) Appl. No.: 18/223,194

(22) Filed: Jul. 18, 2023

(65) Prior Publication Data

US 2024/0021372 A1 Jan. 18, 2024

Related U.S. Application Data

(60) Provisional application No. 63/368,696, filed on Jul. 18, 2022.

(51) Int. Cl.

*H01G 7/00* (2006.01)
*H01G 4/01* (2006.01)
*H01G 4/012* (2006.01)
*H01G 4/252* (2006.01)
*H01G 4/30* (2006.01)
*H01G 4/38* (2006.01)
(Continued)

(52) U.S. Cl.

CPC ............... *H01G 4/01* (2013.01); *H01G 4/012* (2013.01); *H01G 4/252* (2013.01); *H01G 4/30* (2013.01); *H01G 4/38* (2013.01); *H01G 4/008* (2013.01); *H01G 4/10* (2013.01)

(58) Field of Classification Search

CPC ...... H01G 9/0425; H01G 9/012; H01G 9/055; H01G 9/15; H01G 9/048; H01G 4/30; H01G 4/01; H01G 4/10; H01G 4/012; H01G 4/008; H01G 4/38; H01G 4/252
See application file for complete search history.

(56) References Cited

U.S. PATENT DOCUMENTS 5,365,790 A * 11/1994 Chen ..................... G01L 9/0042
361/283.4
9,743,534 B2 * 8/2017 Tomikawa ........... H05K 3/4697
(Continued)

OTHER PUBLICATIONS

International Search Report for PCT/2021/016757; mailed Jul. 21, 2021.

*Primary Examiner* — Paul D Kim
(74) *Attorney, Agent, or Firm* — Stetina Garred Brucker & Newboles

(57) ABSTRACT

A capacitor includes a conductive substrate having a front side and a back side, a pre-drilled via that runs from the front side of the conductive substrate to the back side of the conductive substrate, a dielectric layer on the conductive substrate, a conductive polymer layer on the dielectric layer, a first metal contact electrically connected to the conductive substrate, and a second metal contact electrically isolated from the first metal contact and electrically connected to the conductive polymer on both sides of the conductive substrate through the pre-drilled via, the first and second metal contacts being formed on the front side of the conductive substrate. A portion of the conductive substrate may be removed to leave the capacitor structurally connected only by the insulating material to an adjacent device formed on the same conductive substrate.

10 Claims, 10 Drawing Sheets

(51) Int. Cl.

| | |
|---|---|
| *H01G 4/008* | (2006.01) |
| *H01G 4/10* | (2006.01) |

(56) References Cited

U.S. PATENT DOCUMENTS

| | | | | |
|---|---|---|---|---|
| 10,679,794 | B2 * | 6/2020 | Fujii | H05K 1/162 |
| 2015/0264815 | A1 * | 9/2015 | Shimabe | H05K 1/185 29/25.41 |
| 2019/0080849 | A1 | 3/2019 | Fujii et al. | |
| 2023/0067888 | A1 | 3/2023 | Gopalaswamy et al. | |
| 2023/0073898 | A1 | 3/2023 | Shafiei et al. | |

* cited by examiner 120
110

METHOD OF MAKING A CAPACITOR

CROSS-REFERENCE TO RELATED APPLICATIONS

This application relates to and claims the benefit of U.S. Provisional Application No. 63/368,696, filed Jul. 18, 2022 and entitled "Double-Sided Capacitor and Methods of Making the Same," the entire contents of which is incorporated by reference herein.

STATEMENT RE: FEDERALLY SPONSORED RESEARCH/DEVELOPMENT

Not Applicable

BACKGROUND

The present disclosure generally relates to capacitors and, more particularly, to double-sided capacitors that exhibit high capacitance and low series resistance.

Capacitors are an important part of many integrated and embedded circuits and are commonly used as energy storage structures, filters, or as specific components of complex circuits. Capacitors generally make use of high surface area to achieve high capacitance values and are commonly arranged as a pair of thin electrodes separated by a dielectric and rolled into a tight cylindrical structure to optimize the surface area per unit volume. They are also made as deep trenches in silicon to benefit from more surface area, or as layers of dielectric and metal stacked and connected to each other to benefit from both permittivity and surface area.

Efforts to maximize capacitance and minimize equivalent series resistance (ESR) of capacitors have led to the development of double-sided capacitors such as those described in Applicant's own U.S. Patent Application Pub. No. 2023/0067888, entitled "Planar High-Density Aluminum Capacitors for Stacking and Embedding" ("the '888 publication"), the entire contents of which is incorporated by reference herein. Such arrangements may define a second electrode (e.g., a cathode), such as a conductive polymer, metal, or ceramic, that is disposed on both sides of a first electrode (e.g., an anode) made of aluminum that has been etched or otherwise modified to have a high surface area, with an oxide layer formed therebetween to act as the dielectric. While such double-sided capacitors have the potential to double the usable surface area of the first electrode, they require the formation of structures for accessing the side of the first electrode that is opposite to the device terminals. To this end, through vias may be cut through the built-up stack and filled with a solid conductor to provide conductivity between a top metal layer and a bottom metal layer of the device that are electrically connected to the second electrode while being electrically isolated from the first electrode, thereby capturing the double-sided capacitance. However, in addition to being time-consuming, the formation of such through vias may generate heat (due to laser drilling, for example), which may lower the conductivity of the second electrode material, increasing the ESR of the capacitor. In the worst case, debris and mechanical tensions caused by via formation may lead to delamination or fracture, resulting in device failure.

BRIEF SUMMARY

The present disclosure contemplates various devices and methods for overcoming the above drawbacks accompanying the related art. One aspect of the embodiments of the present disclosure is a capacitor. The capacitor may comprise a conductive substrate having a front side and a back side, a via that runs from the front side of the conductive substrate to the back side of the conductive substrate, a dielectric layer on the conductive substrate extending from the front side to the back side thereof through the via, a conductive polymer layer on the dielectric layer extending from the front side to the back side of the conductive substrate through the via to fill the via, a first metal contact electrically connected to the conductive substrate, and a second metal contact electrically isolated from the first metal contact and electrically connected to the conductive polymer layer. The first and second metal contacts may be formed on the front side of the conductive substrate and may serve as device terminals.

The conductive substrate may comprise etched aluminum. The dielectric layer may comprise aluminum oxide. The capacitor may comprise a carbonaceous layer on the conductive polymer layer. The capacitor may comprise a metallization layer on the conductive polymer layer. The second metal contact may be electrically connected to the conductive polymer layer through the metallization layer. The metallization layer may comprise a diffusion barrier.

Another aspect of the embodiments of the present disclosure is a method of making a capacitor. The method may comprise providing a conductive substrate having a front side and a back side, drilling a via from the front side of the conductive substrate to the back side of the conductive substrate, and forming a dielectric layer on the conductive substrate, the dielectric layer extending from the front side to the back side thereof through the via. The method may further comprise applying a conductive polymer layer on the dielectric layer, the conductive polymer layer extending from the front side to the back side of the conductive substrate through the via to fill the via. The method may further comprise forming a first metal contact electrically connected to the conductive substrate and forming a second metal contact electrically isolated from the first metal contact and electrically connected to the conductive polymer layer. The first and second metal contacts may be formed on the front side of the conductive substrate and may serve as device terminals.

The conductive substrate may comprise etched aluminum. The dielectric layer may comprise aluminum oxide. Forming the dielectric layer may comprise anodizing the conductive substrate to grow the aluminum oxide within the via. The method may comprise applying a carbonaceous layer on the conductive polymer layer. The method may comprise applying a metallization layer on the conductive polymer layer. The second metal contact may be electrically connected to the conductive polymer layer through the metallization layer. Applying the metallization layer may comprise depositing a diffusion barrier on the conductive polymer layer and depositing metal adjacent the diffusion barrier.

Another aspect of the embodiments of the present disclosure is a method of making a capacitor. The method may comprise providing a conductive substrate having a front side and a back side and having a dielectric layer formed thereon, drilling a via from the front side of the conductive substrate to the back side of the conductive substrate, and applying a conductive polymer layer on the dielectric layer, the conductive polymer layer extending from the front side to the back side of the conductive substrate through the via to fill the via. The method may further comprise producing a through via by removing the conductive polymer layer from the via to separate the conductive polymer layer into a front portion on the front side of the conductive substrate and a back portion on the back side of the conductive substrate, the front and back portions of the conductive polymer layer being electrically isolated from each other. The method may further comprise filling the through via with an insulating material, removing a portion of the insulating material from the through via, forming a first metal contact electrically connected to the conductive substrate, and forming a second metal contact electrically isolated from the first metal contact and electrically connected to the first and second portions of the conductive polymer layer by the through via.

The conductive substrate may comprise etched aluminum. The dielectric layer may comprise aluminum oxide. The method may comprise applying a carbonaceous layer on the conductive polymer layer. Producing the through via may further be performed by removing a portion of the carbonaceous layer. The method may comprise applying a metallization layer on the conductive polymer layer. The second metal contact may be electrically connected to the conductive polymer layer through the metallization layer. Producing the through via may further be performed by removing a portion of the metallization layer. The method may comprise drilling one or more isolation trenches from the front side of the conductive substrate to the back side of the conductive substrate. The conductive polymer may extend from the front side to the backside of the conductive substrate through the one or more isolation trenches to fill the one or more isolation trenches. The method may comprise reestablishing the one or more isolation trenches by removing the conductive polymer layer therefrom and filling the one or more reestablished isolation trenches with the insulating material. The method may comprise removing a portion of the conductive substrate to leave the capacitor structurally connected only by the insulating material to an adjacent device formed on the same conductive substrate.

Another aspect of the embodiments of the present disclosure is a capacitor comprising a conductive substrate having a front side and a back side, a pre-drilled via that runs from the front side of the conductive substrate to the back side of the conductive substrate, a dielectric layer on the conductive substrate, a conductive polymer layer on the dielectric layer, a first metal contact electrically connected to the conductive substrate, and a second metal contact electrically isolated from the first metal contact and electrically connected to the conductive polymer on both sides of the conductive substrate through the pre-drilled via, the first and second metal contacts being formed on the front side of the conductive substrate.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 is a detailed series of top and corresponding cross-sectional views of processing stages in manufacturing a capacitor according to an embodiment of the present disclosure.

DETAILED DESCRIPTION

The present disclosure encompasses various embodiments of capacitors and methods of manufacturing the same. The detailed description set forth below in connection with the appended drawings is intended as a description of several currently contemplated embodiments and is not intended to represent the only form in which the disclosed subject matter may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
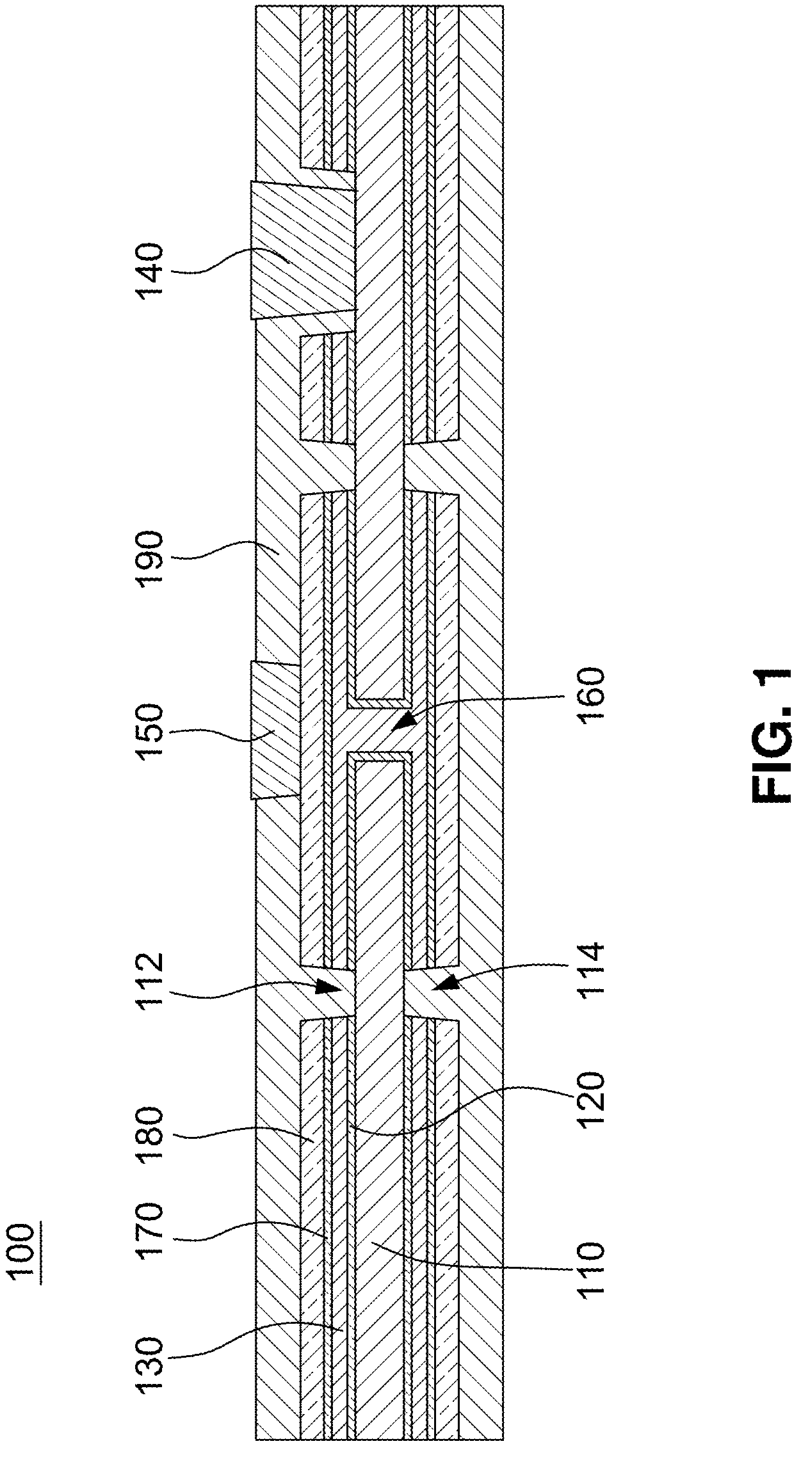
FIG. 1 is a cross-sectional view of a capacitor according to an embodiment of the present disclosure.

FIG. 1 is a cross-sectional view of a capacitor 100 according to an embodiment of the present disclosure. The capacitor 100 may comprise a conductive substrate 110 serving as a first electrode (e.g., an anode), a dielectric layer 120, and a conductive polymer layer 130 serving as a second electrode (e.g., a cathode). The capacitor 100 may be incorporated into energy storage structures, filters, or other circuit components by way of first and second metal contacts 140, 150 that are electrically isolated from each other and electrically connected to the conductive substrate 110 and the conductive polymer layer 130, respectively. In order to achieve effectively twice the surface area and thus twice the capacitance of a single-sided device, the capacitor 100 may be double-sided in the sense that it may include the dielectric layer 120 and conductive polymer layer 130 serving as the second electrode not only on a front side 112 of the conductive substrate 110 (e.g., on which the metal contacts 140, 150 may be formed) but on a back side 114 as well. To this end, access to the back side 114 of the capacitor 100 may advantageously be provided by virtue of the conductive polymer layer 130 filling a pre-drilled via 160 that runs from the front side 112 to the back side 114 of the conductive substrate 110. In this way, the conductive polymer layer 130 may wrap around and cover both sides 112, 114 of the conductive substrate 110 to function as a single second electrode without there being a need to later form and fill a through via to provide conductivity from one side to the other. As a result, the heat, lower conductivity, debris, and mechanical tensions caused by via formation may be completely avoided. At the same time, the expensive and time-consuming via formation techniques that might otherwise be used to reduce these risks may be skipped in favor of simpler and less critical pre-drilling processes.

Figures 2A, 2B, 2C, 2D:
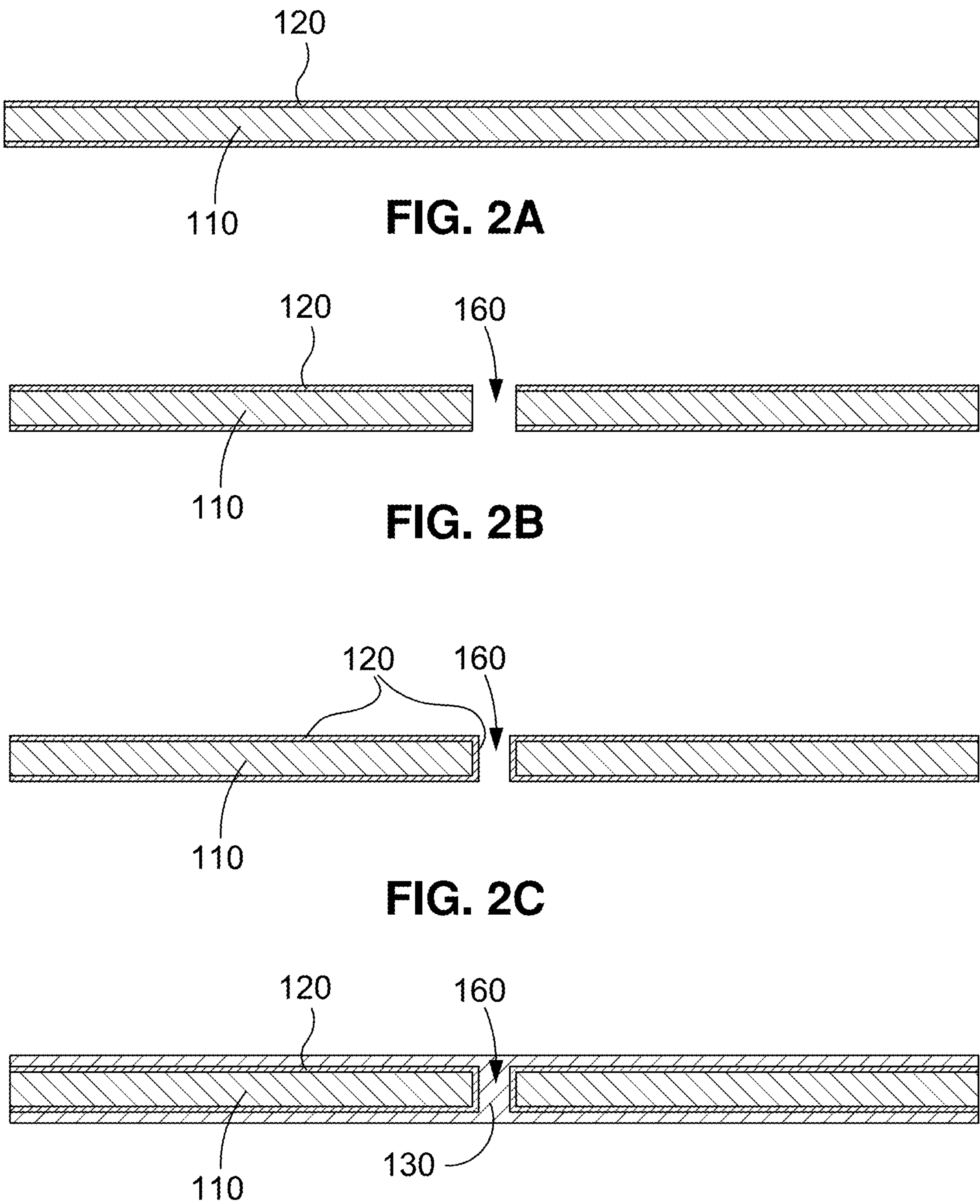
FIG. 2A is a cross-sectional view of a processing stage in manufacturing a capacitor according to an embodiment of the present disclosure.
FIG. 2B is a cross-sectional view of another processing stage in manufacturing the capacitor.
FIG. 2C is a cross-sectional view of another processing stage in manufacturing the capacitor.
FIG. 2D is a cross-sectional view of another processing stage in manufacturing the capacitor.

FIGS. 2A-2G are cross-sectional views of various processing stages in manufacturing the capacitor 100 shown in FIG. 1. The process may begin with providing the conductive substrate 110 as shown in FIG. 2A. The conductive substrate 110 may be made of aluminum, an aluminum alloy, or another material that is etched or otherwise modified to have a high surface area, such as an etched aluminum foil as described in the '888 publication. Alternative or additional modifications to increase the surface area of the conductive substrate 110 may include deposition of a sintered aluminum powder or other aluminum, aluminum oxide, titanium, or titanium oxide powder thereon. The conductive substrate 110 may be a metal foil as described in Applicant's own U.S. Patent Application Pub. No. 2023/0073898, entitled "Modified Metal Foil Capacitors and Methods for Making Same," the entire contents of which is incorporated by reference herein. As shown, a dielectric layer 120 such as a naturally occurring oxide layer (e.g., an aluminum oxide layer), or one that has been grown by an anodization process, may be formed on both sides of the conductive substrate 110. As may be appreciated, the dielectric layer 120 may, in general, exhibit the same high surface area as the underlying conductive substrate 110 as it fills in and takes the shape of the various tunnels and recesses that may result from the etching or other modification to the material of the conductive substrate 110.

The process of manufacturing the capacitor 100 disclosed herein may proceed with drilling a via 160 from the front side 112 of the conductive substrate 110 to the back side 114 of the conductive substrate 110 as shown in FIG. 2B (see also FIG. 1). The via 160 may be drilled using a laser drill such as a nanosecond laser. Advantageously, because the aluminum substrate 110 is cut through prior to stack build up, the drilling process may be done more quickly and inexpensively in comparison to the downstream formation of conductive through vias (which might require a high-precision femtosecond laser, for example), without concern about generating excess heat and debris or otherwise damaging the capacitor 100. Once the via 160 is drilled, the process may proceed with forming the dielectric layer 120 on the conductive substrate 110 where the drilling resulted in an exposed (previously internal) surface of the conductive substrate 110. Thus, as shown in FIG. 2C, the dielectric layer 120 may extend from the front side 112 to the back side 114 of the conductive substrate 110 through the via 160. Forming the dielectric layer 120 may comprise anodizing the conductive substrate 110 (e.g., by placing the conductive substrate 110 in an electrolytic solution and passing a current through the solution) to grow an oxide layer within the via 160. Alternatively, a humidity chamber may be used to grow the dielectric layer 120 by thermal oxidation (e.g., at a temperature between 800 and 1200 degrees Celsius with water vapor or molecular oxygen as the oxidant), or the dielectric layer 120 may be coated on the conductive substrate 110 (e.g., by atomic layer deposition).

Referring to FIG. 2D, the process of manufacturing the capacitor 100 may continue with applying a conductive polymer layer 130 on the dielectric layer 120. Owing to the pre-drilling of the via 160, the conductive polymer layer 130 may advantageously extend from the front side 112 to the back side 114 of the conductive substrate 110 through the via 160, filling the via 160 as it covers both sides of the dielectric-covered conductive substrate 110. In this way, the second electrode (e.g., cathode) defined by the conductive polymer layer 130 may beneficially extend over both sides of the first electrode (e.g., anode) defined by the conductive substrate 110 with the dielectric layer 120 therebetween, effectively taking advantage of both sides of the conductive substrate 110 to double the surface area and thus the capacitance. It is noted that, like the dielectric layer 120, the conductive polymer layer 130 may exhibit the same high surface area as the underlying conductive substrate 110 as it fills in and takes the shape of the various tunnels and recesses that may result from the etching or other modification to the material of the conductive substrate 110, in this case with the dielectric layer 120 sandwiched therebetween. A variety of conductive polymers may be suitable for use as the second electrode of the capacitor 100 described herein. The conductive polymer layer 130 may, for example, comprise one or more of a polypyrrole, a polythiophene, a polyaniline, a polyacetylene, a polyphenylene, a poly(p-phenylene-vinylene), PEDOT:PSS (poly(3,4-ethylenedioxythiophene) polystyrene sulfonate), or P3HT (poly(3-hexylthiophene-2,5-diyl)).

Figure 2E:
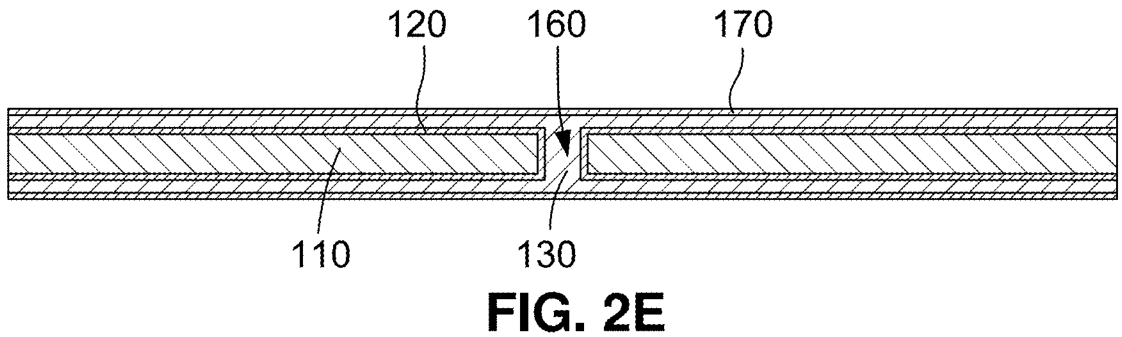
FIG. 2E is a cross-sectional view of another processing stage in manufacturing the capacitor.
Figure 2F:
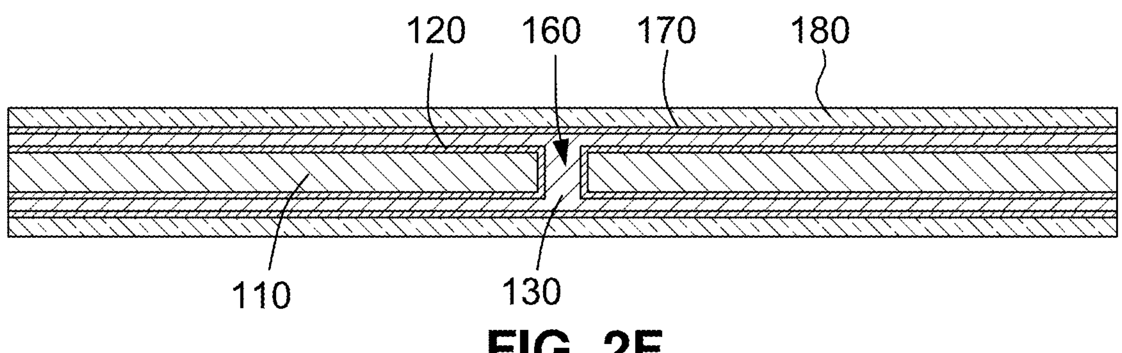
FIG. 2F is a cross-sectional view of another processing stage in manufacturing the capacitor.

Prior to the formation of the metal contacts 140, 150 (see FIG. 1), additional layers may be built up on the conductive polymer layer 130 in order to improve the electrical connection between the polymer layer 130 and the second metal contact 150. For example, as shown in FIGS. 2E and 2F, respectively, a carbonaceous layer 170 and/or a metallization layer 180 may be applied on the conductive polymer layer 130. The carbonaceous layer 170 may be applied in direct, physical contact with the conductive polymer layer 130, and the metallization layer 180 may be applied on the conductive polymer layer 130 by being in direct, physical contact with the carbonaceous layer 170 thereon. Preferably, the application of the metallization layer 180 may comprise depositing a diffusion barrier on the conductive polymer layer (e.g., directly in contact with the carbonaceous layer 170 thereon) and depositing metal adjacent the diffusion barrier. The carbonaceous layer 170, if included, may advantageously reduce a contact resistance between the conductive polymer layer 130 and other components, such as a diffusion barrier layer of the metallization layer 180. The carbonaceous layer 170 may include, for example, carbon black, graphite, a carbon-based ink, or a polymeric, and may be applied using a variety of techniques, such as screen printing, inkjet printing, sputter deposition, vacuum deposition, spin coating, doctor blading, or the like. The metallization layer 180 may be used to provide high-quality electrical conductivity between the conductive polymer layer 130 (acting as the second electrode of the capacitor 100) and the electrical contact 150 for electrical connection of the capacitor 100 with an external circuit. The metallization layer 180 may include a metal such as Ag, Au, Cu, Pt, Pd, and/or composites or alloys of the aforementioned metals, or in some cases polymers such as epoxies, silicones, or fluoroelastomers. Including a diffusion barrier layer in the metallization layer 180 may limit infiltration of components from the metallization layer 180 into the carbonaceous layer 170 or conductive polymer layer 130. Example materials for a diffusion barrier layer include, but are not limited to, Ti, W, Cr, Ti—W, TaN, and/or Co—W. The metallization layer 180, as well as any diffusion barrier layer thereof, may be applied using any suitable techniques, such as vacuum deposition (e.g., sputter deposition).

Figure 2G:
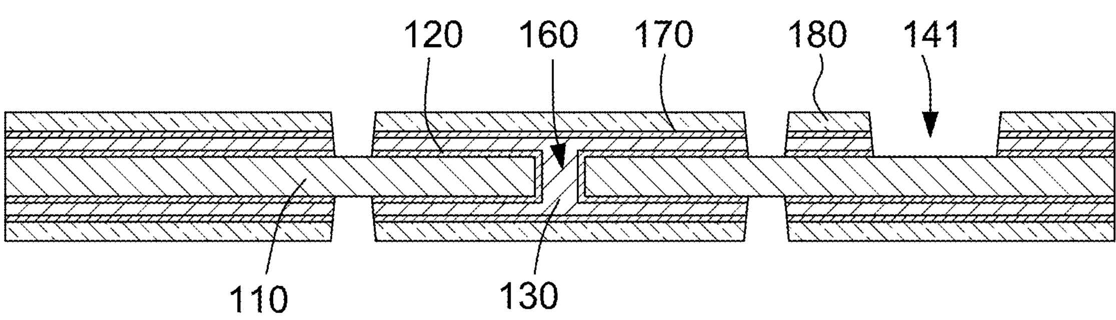
FIG. 2G is a cross-sectional view of another processing stage in manufacturing the capacitor.

In order to electrically connect the conductive substrate 110, serving as the first electrode (e.g., anode), to an external circuit, the process of manufacturing the capacitor 100 may include laser processing as illustrated in FIG. 2G. In particular, a via 141 (e.g., a blind via) may be formed to reveal a portion of the conductive substrate 110. As may be appreciated, the via 141 need not extend through the conductive substrate 110 and need only entail the removal of the thinner and more easily removed layers 120, 130, 170, and 180. As such, formation of the via 141 does not pose the same concerns as the more destructive through via drilling that may advantageously be avoided by virtue of the pre-drilled via 130 described herein. Referring back to the finished capacitor 100 shown in FIG. 1, the first metal contact 140 may be formed within the via 141 so as to be electrically connected to the conductive substrate 110 (e.g., by direct, physical contact therewith) without being electrically connected to the conductive polymer layer 130. The second metal contact 150 may accordingly be electrically isolated from the first metal contact 140 and electrically connected to the conductive polymer layer 130 (e.g., through the metallization layer 180 and/or carbonaceous layer 170) as shown in FIG. 1. In this way, both the first and second metal contacts 140, 150 may advantageously be formed on the front side 112 of the conductive substrate 110, with the pre-drilled via 130 allowing the conductive polymer layer 130 to extend to and capture the capacitance from both sides 112, 114 of the conductive substrate 110, without the need for subsequently formed through vias or landing pads on the back of the capacitor 100. It is noted that the first and second metal contacts 140, 150 may include one or more materials applied in one or more processing steps and may include, for example, via fill, terminal metal, and/or landing pads. An insulating material 190, which may be a thermosetting film such as an Ajinomoto Build-up Film (ABF), may be applied on at least a portion of the metallization layer 180 to fill in regions between the components.

Advantageously, the use of the pre-drilled via 130 to allow the conductive polymer layer 130 to reach both sides 112, 114 of the conductive substrate 110 may reduce the length of the inductance loops that occur in the capacitor 100, in comparison to the longer inductance loops that occur when connecting metal contacts all the way to a metallization layer on the back of the device using a through via. As a result, the bandwidth of the capacitor 100 may be improved, with operational frequencies up to 100 MHz, for example.

FIGS. 3A-3H are top views of various processing stages in manufacturing a capacitor 300 that may be the same as the capacitor 100 except as described herein. Except as otherwise described, the same steps may be performed in the manufacture of the capacitor 100. Referring to the lower portion of FIG. 3A, a top view that may be thought of as corresponding to the cross-sectional views of FIGS. 2B and 2C is shown, in which a via 160 has been pre-drilled through the conductive substrate 110. From the perspective of FIG. 3A, similarly drilled isolation trenches 162 may be seen demarcating the boundaries of the capacitor 100, 300 to be produced. To scale up production, it is contemplated that manufacturing equipment 30 may be used as shown schematically in the upper portion of FIG. 3A, by which a coil 32 of substrate may be run under tension beneath multiple relatively inexpensive nanosecond IR lasers 34 to reach suitable line speeds with a flying shear 36 at the end to produce individual sheets of any dimension necessary. The lasers 34 may be the same that are already used prior to stack buildup to add fiducial marks 112 to the conductive substrates 110, for example. The lasers 34 may quickly and inexpensively remove the bulk of the material at this initial stage in the process, making it unnecessary to risk removing the material at later stages of the process when it is possible to damage the stack. Instead of or in addition to nanosecond lasers, excimer lasers, copper vapor lasers, or other q-switched pulse laser are contemplated, as well as mechanical means (e.g., a drill bit, punch, or end mill).

Figure 3A:
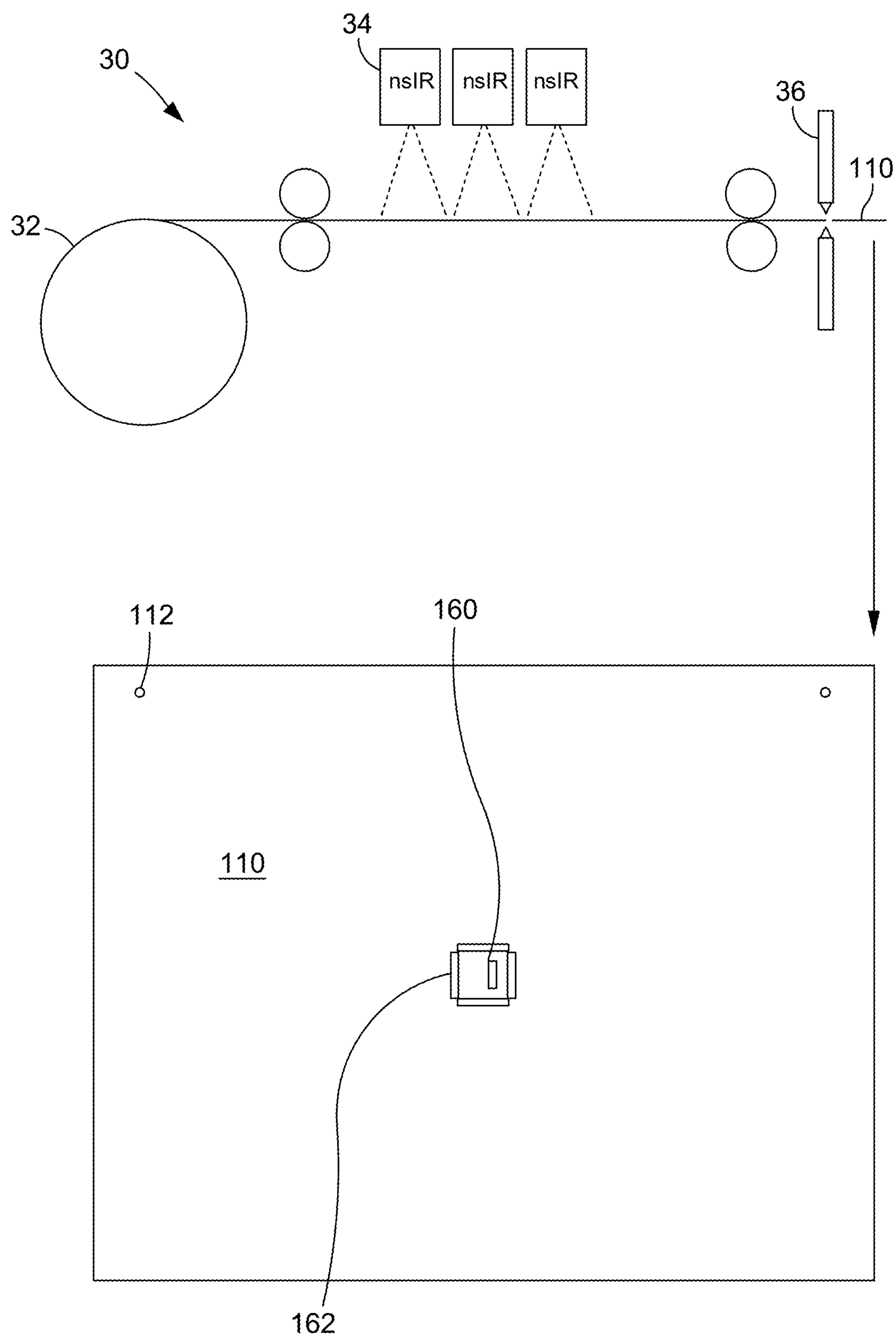
FIG. 3A is a top view of a processing stage in manufacturing a capacitor according to an embodiment of the present disclosure, along with a schematic representation of manufacturing equipment therefor.
Figure 3B:
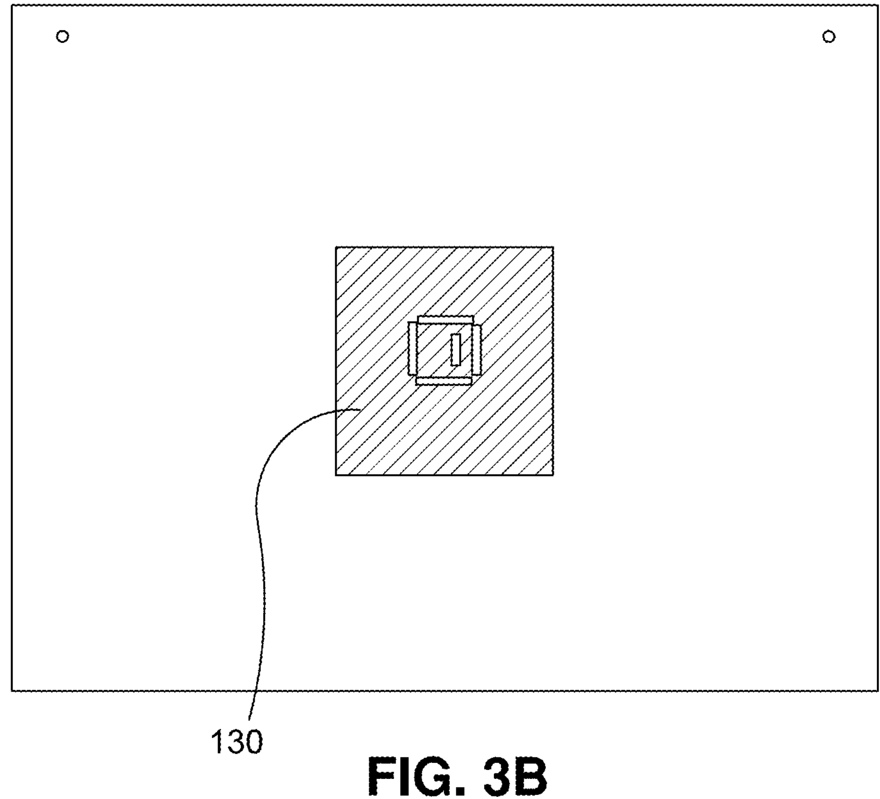
FIG. 3B is a top view of another processing stage in manufacturing the capacitor.
Figure 3C:
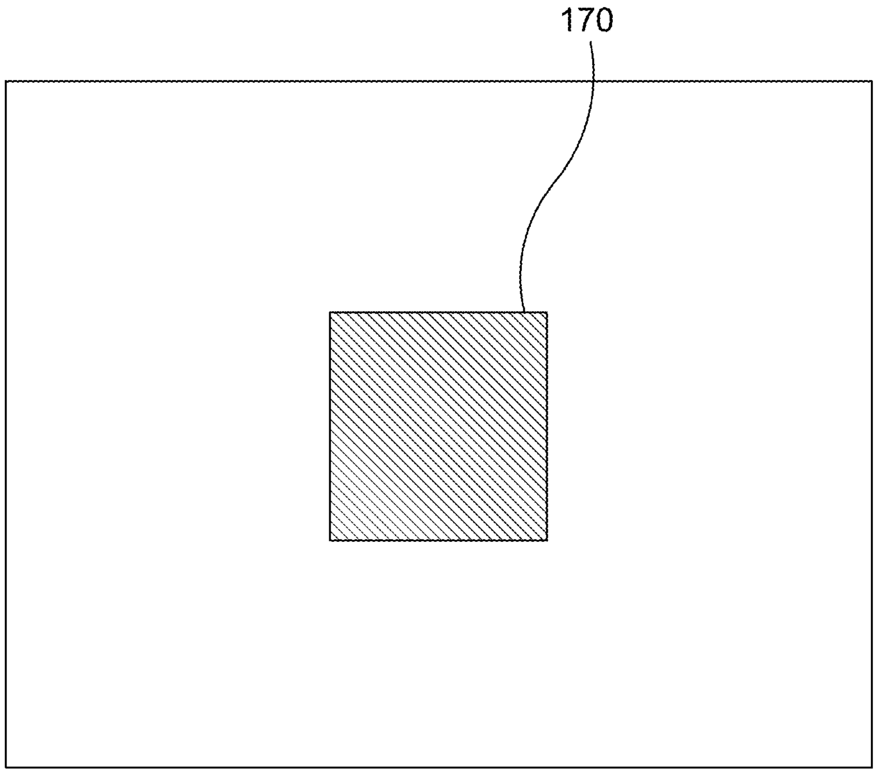
FIG. 3C is a top view of another processing stage in manufacturing the capacitor.
Figure 3D:
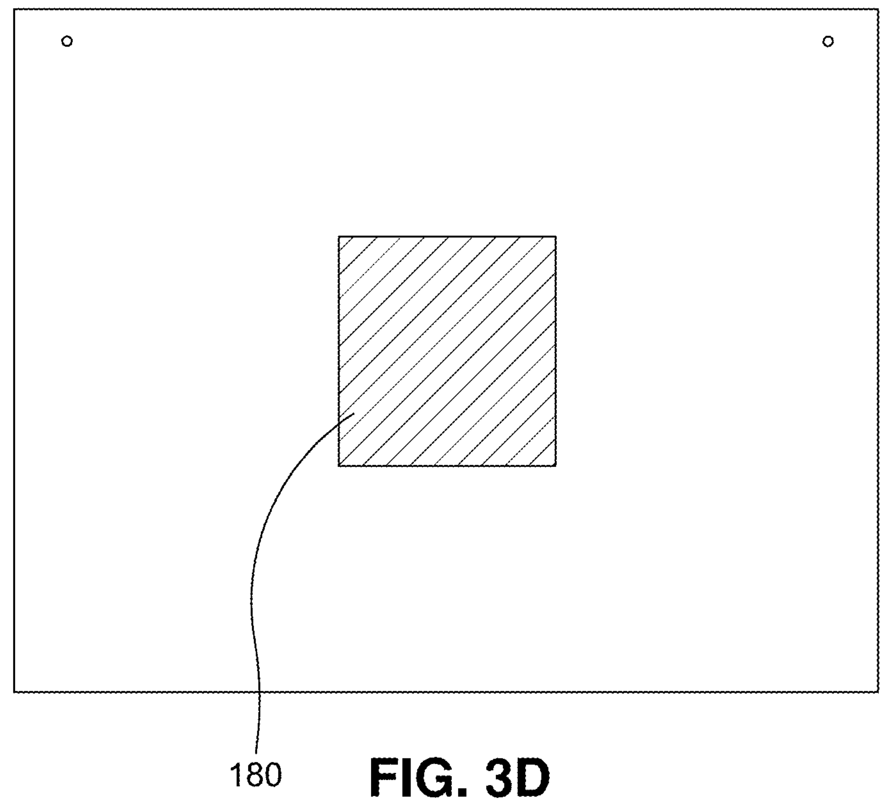
FIG. 3D is a top view of another processing stage in manufacturing the capacitor.

The process may continue with FIGS. 3B, 3C, and 3D, showing the addition of the conductive polymer layer 130, carbonaceous layer 170, and metallization layer 180, respectively, as described above in relation to FIGS. 2D, 2E, and 2F. In the case of manufacturing the capacitor 100, the step of applying the conductive polymer layer 130 as shown in FIG. 3B (and FIG. 2D) may be subsequent to a step of forming the dielectric layer 120 within the via 160 (as shown in FIG. 2C), which may in some cases entail an anodization process to produce a dielectric layer 120 of suitable thickness for the capacitor 100. Following the stage shown in FIG. 3D (corresponding to FIG. 2F), the manufacture of the capacitor 100 may proceed as described above in relation to FIG. 2G and as shown in FIG. 1.

Figure 3E:
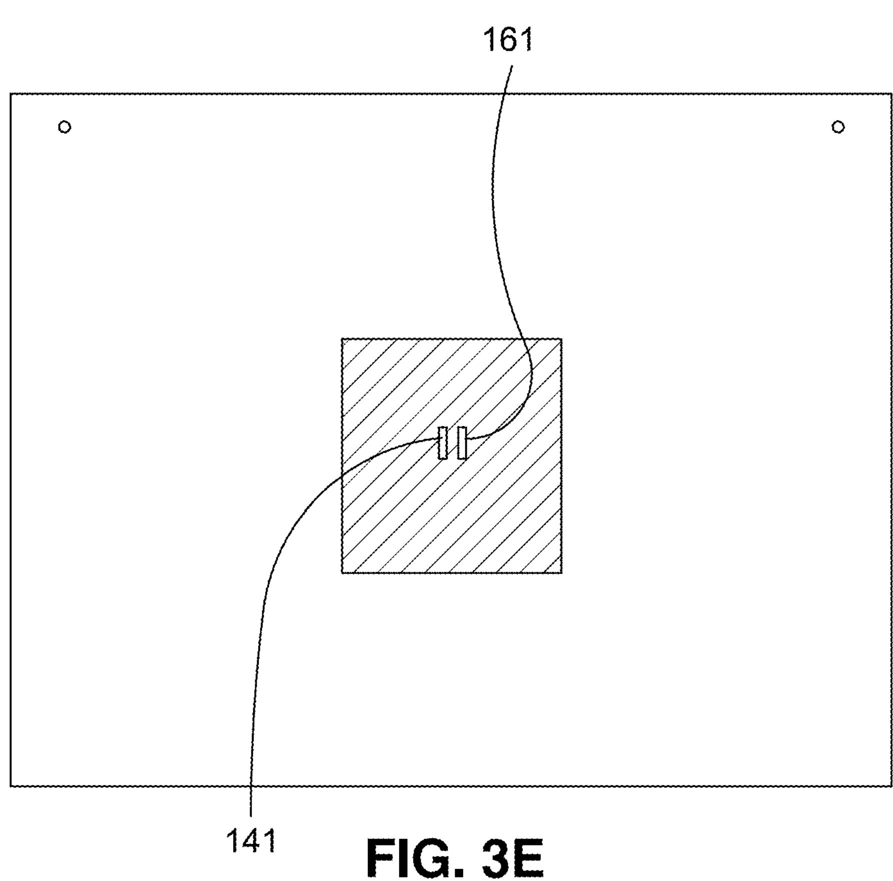
FIG. 3E is a top view of another processing stage in manufacturing the capacitor.

Alternatively, however, the process may continue as shown in FIGS. 3E-3H to produce a capacitor 300 that differs from the capacitor 100 as follows. FIG. 4 shows an exemplary cross-sectional view of the capacitor 300 (taken along the line 4-4 in FIG. 3H) that may be produced thereby. Referring to FIGS. 3E and 4, in addition to formation of a via 141 for connecting to the conductive substrate 110 (e.g., an anode connection), which may preferably be a blind via as described above, the manufacturing process may further include producing a through via 161 at the site of the pre-drilled via 140. That is, the conductive polymer layer 130 that was within the via 140, along with vertically adjacent portions of the carbonaceous layer 170 and metallization layer 180, may be removed from the via 140 to separate the conductive polymer layer 130 into a front portion on the front side 112 of the conductive substrate 110 and a back portion on the back side 114 of the conductive substrate 110. These front and back portions of the conductive polymer layer 130 may thus be electrically isolated from each other, requiring the subsequent introduction of a conductive connection through the newly established through via 161 to provide double-sided capacitance as described below. Advantageously, because the through via 161 is at the site of the pre-drilled via 140, the aluminum substrate 110 is already absent in this region. Thus, as may be appreciated, the through via 161 need only entail the removal of the more easily removed layers 130, 170, and 180 (and in some cases dielectric layer 120). As such, formation of the through via 161 is not as destructive as conventional through via drilling and does not pose the same concerns. At the same time, it is contemplated that the manufacture of the capacitor 300 may advantageously omit the step of forming the dielectric layer 120 within the pre-drilled via 140 and, in particular, may omit any expensive and time-consuming anodization process. This is because, in the case of the capacitor 300, the front and back portions of the conductive polymer layer 130 are isolated from each other by the formation of the through via 161 that removes the interconnecting polymer, such that there is no danger of breakdown within the via 161 and no concern about the amount of dielectric layer 120 remaining in the via 161, if any. (It is noted that the original outer surfaces of the conductive substrate 110 may be pre-anodized so that there is sufficient dielectric layer 120 on the front and back surfaces 112, 114 of the substrate 110.)

Figure 3F:
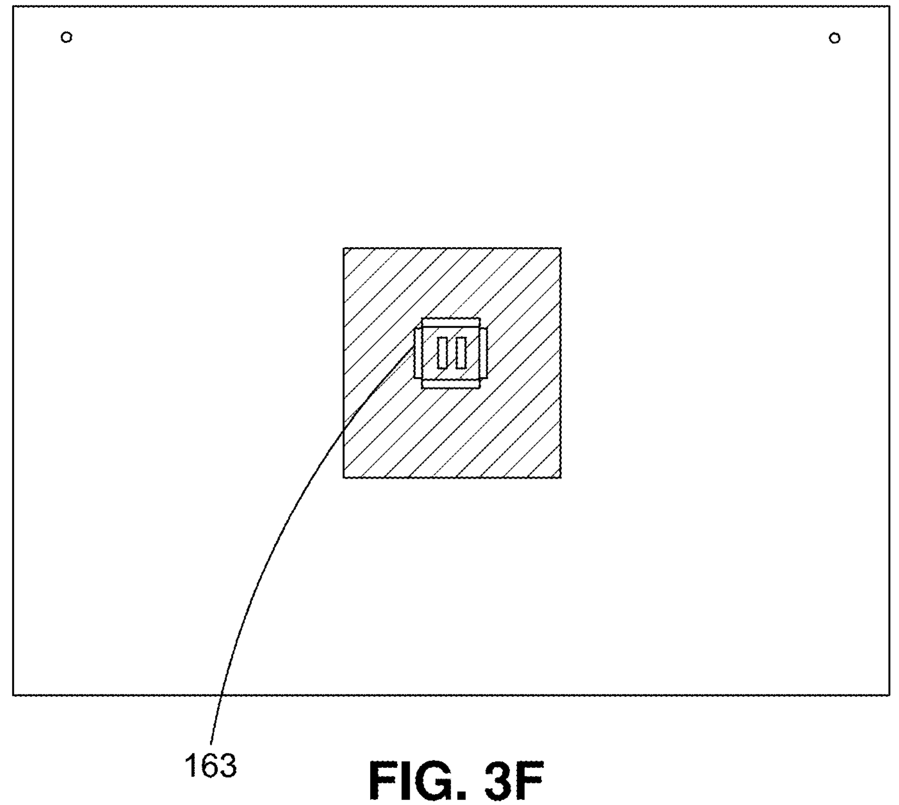
FIG. 3F is a top view of another processing stage in manufacturing the capacitor.
Figure 4:
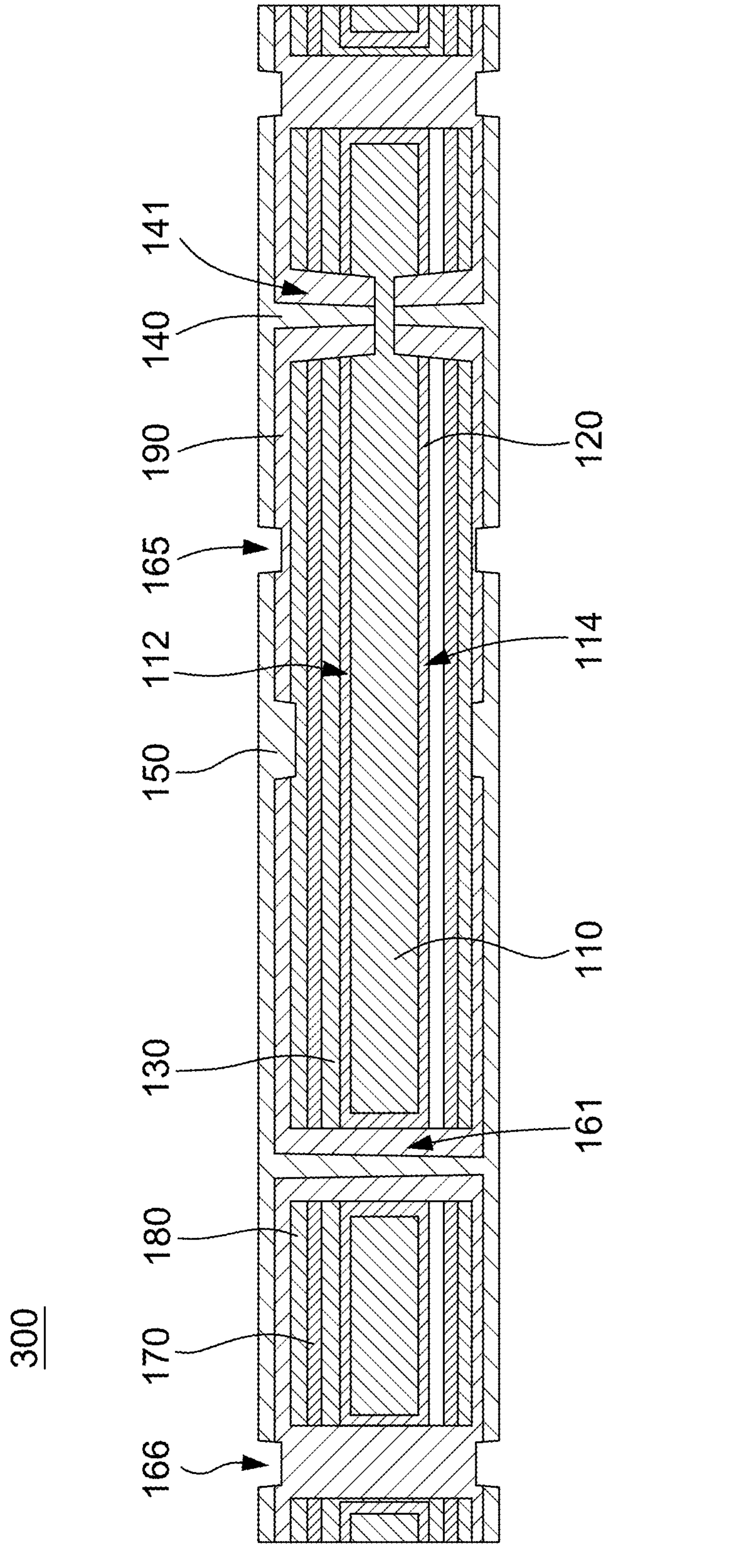
FIG. 4 is a cross-sectional view of a capacitor according to an embodiment of the present disclosure.

In addition to producing the through via 161 at the site of the pre-drilled via 140, the manufacturing process may further include producing isolation trenches 163 at the site of the isolation trenches 162 as shown in FIG. 3F. That is, the isolation trenches 162 that were pre-drilled during the manufacturing stage shown in FIG. 3A (i.e., prior to stack buildup) may now be "reformed" (as newly established isolation trenches 163) by removing any of the conductive polymer layer 130, carbonaceous layer 170, and/or metallization layer 180 that filled the isolation trenches 162 during the manufacturing stages shown in FIGS. 3B, 3C, and 3D. In this way, the formation of the isolation trenches 162 similarly need only entail the relatively non-destructive removal of the layers 130, 170, and 180 (and in some cases dielectric layer 120).

Figure 3G:
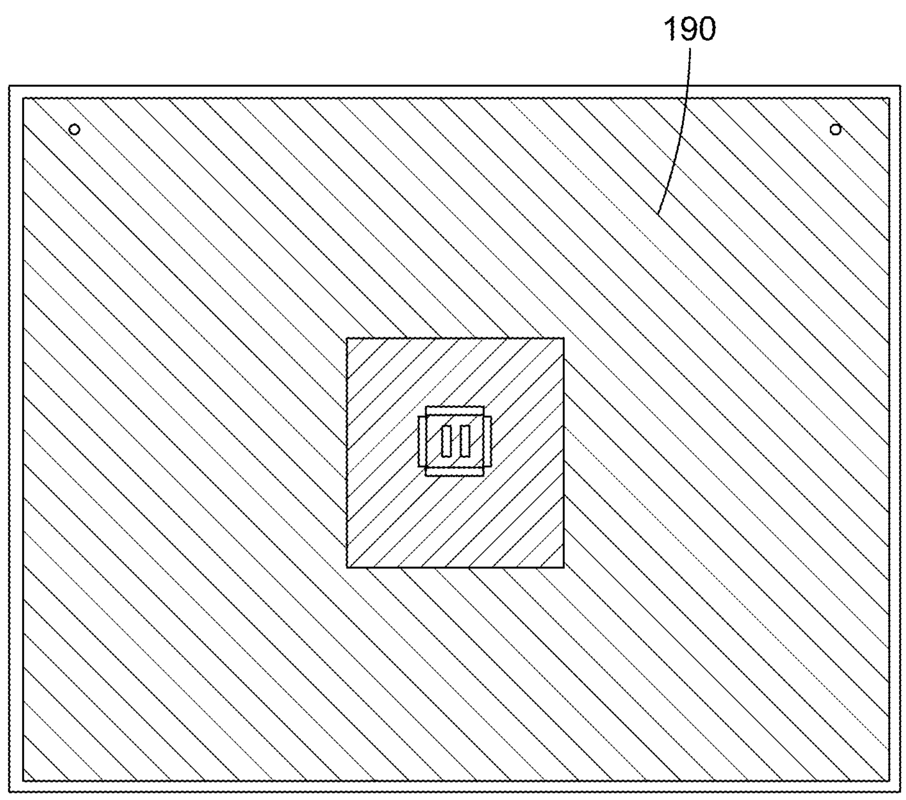
FIG. 3G is a top view of another processing stage in manufacturing the capacitor.

Referring to FIGS. 3G and 4, the manufacturing process may continue with applying insulating material 190 such as ABF on at least a portion of the metallization layer 180 as well as forming first and second metal contacts 140, 150 (see FIG. 4). In particular, as can be seen in FIG. 4, the insulating material 190 may be applied so as to fill the through via 161. A portion of the insulating material 190 may then be removed from the through via 161, leaving a narrower, central via surrounded by the insulating material 190 that may then be filled with metal when forming the second metal contact 150. In this way, the second metal contact 150 may be electrically connected to both isolated portions of the conductive polymer 130 (i.e., the conductive polymer 130 on both sides of the capacitor 300) through the via 161. Similarly, a portion of the insulating material 190 that fills the via 141 may be removed to leave a narrower, central via surrounded by the insulating material 190 that may then be filled with metal when forming the first metal contact 140 (on one or both sides of the substrate 110). Again, it is noted that the first and second metal contacts 140, 150 may include one or more materials applied in one or more processing steps and may include, for example, via fill, terminal metal, and/or landing pads. The first and second metal contacts 140, 150, which are thus electrically connected to the conductive substrate 110 and the conductive polymer layer 130 (both sides), respectively, may subsequently be isolated from each other to define respective anode and cathode voltage domains by the formation of shallow trenches 165 to remove the conductive metal (see FIG. 4).

Figure 3H:
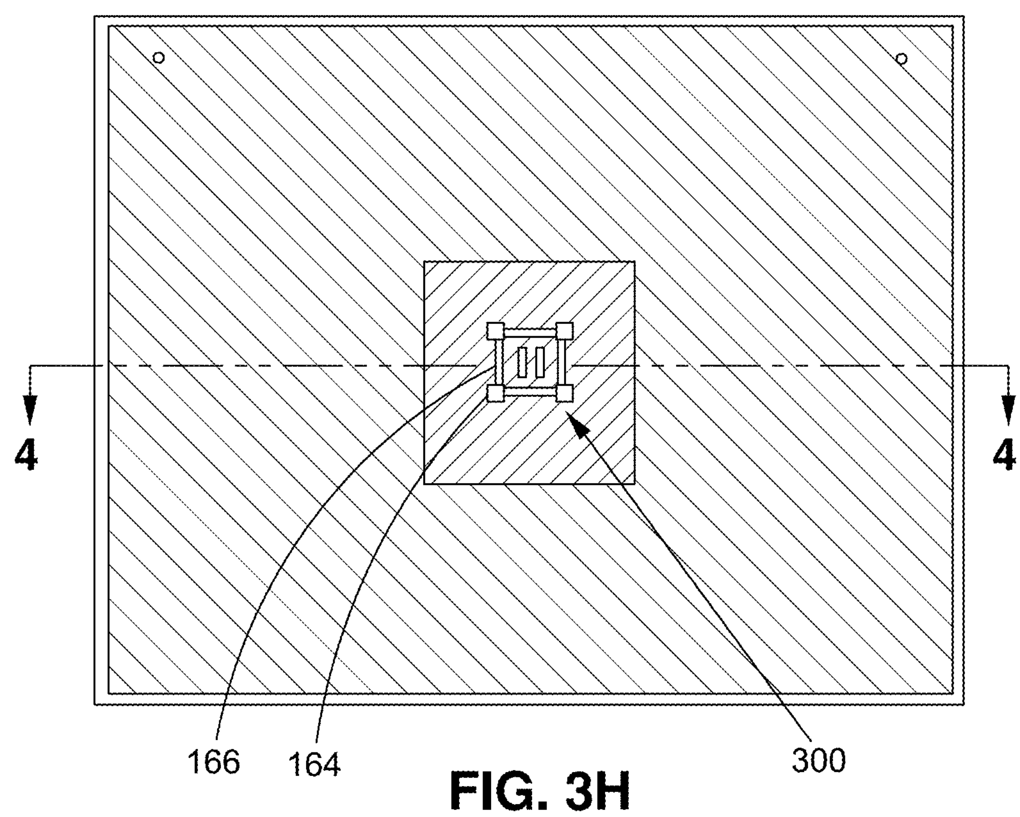
FIG. 3H is a top view of another processing stage in manufacturing the capacitor.
Figure 3I:
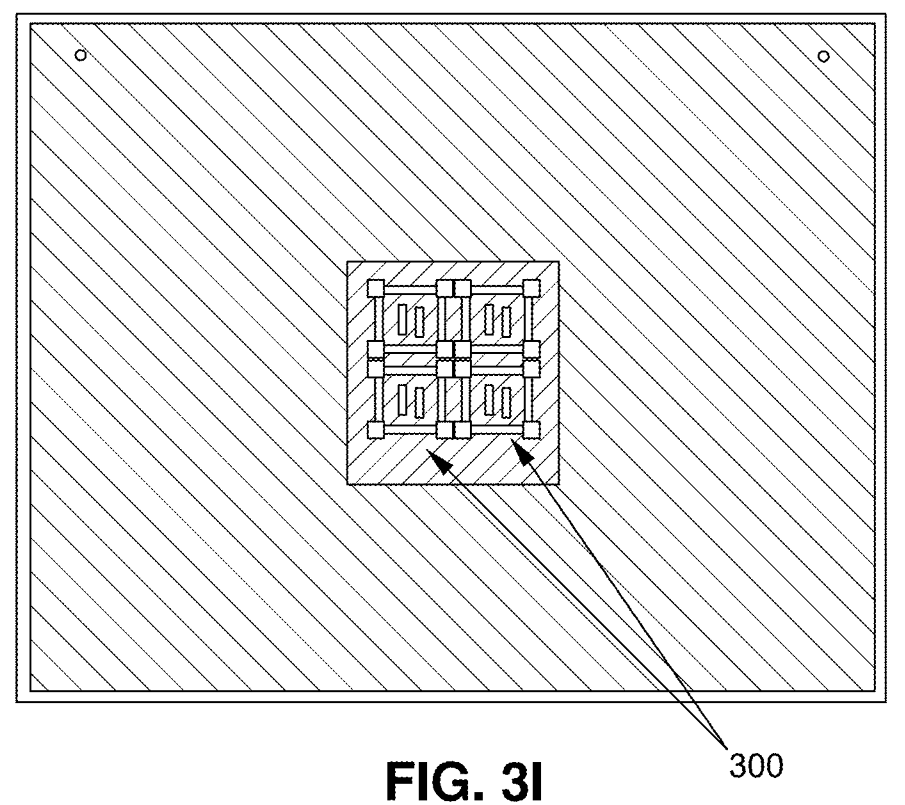
FIG. 3I is a top view of a processing stage in manufacturing a plurality of the capacitors on a single substrate.

The insulating material 190 may also fill the isolation trenches 163 that were previously formed (see FIG. 3F) at the site of the pre-drilled isolation trenches 162. Referring to FIGS. 3H and 4, the manufacturing process may further include the formation of additional shallow trenches 166 to remove, at the site of the isolation trenches 163, the conductive metal that was laid down during formation of the metal contacts 140, 150. In this way, the isolation trenches 163 may isolate the voltage domains of one capacitor 300 from those of an adjacent capacitor 300 built on the same substrate 110. Finally, singulation of individual capacitors 300 may be completed by formation of full-stack through vias 164 that remove the remaining pieces of conductive substrate 110 separating the capacitors 300 (e.g., in the corners of each capacitor 300 as shown in FIG. 3H). In this way, the conductive substrate may be divided into multiple first electrodes (e.g., anodes) in addition to the multiple second electrodes (e.g., cathodes) defined by the shallow trenches 165 (see FIG. 4). The now wholly discrete devices 300 may be kept in place relative to other devices 300 by the ABF or other insulating material 190, resulting in multiple discrete capacitors 300 on the same conductive substrate 110 as shown in FIG. 3I. The capacitors 300 may be structurally connected to adjacent capacitors 300 or other devices only by the insulating material. It is noted that any potential negative effect of drilling through the conductive substrate 110 to form the through vias 164 for device singulation may be minimized by positioning these through vias 164 far from sensitive regions of the capacitor 300 (as well as in general by reducing the usage of full-stack through via formation, as made possible by the pre-drilled vias 160 and pre-drilled isolation trenches 162).

Owing to the separation of individual first electrodes from the conductive substrate 110, the capacitor 300 may advantageously allow for forward biasing in which the first electrodes acting as individual anodes may be given a greater voltage than the second electrodes defined by the voltage domains of the conductive polymer layer 130. As may be appreciated, forward biasing in this way may be preferable in order to prevent thinning of the dielectric layer 120 over time (as may occur when reverse biasing the capacitor 300). However, dividing a stack into discrete capacitors may conventionally require complete separation of the stack (e.g., using a temporary processing substrate) prior to replacing the removed material with an insulating material to reconnect the devices. In addition to requiring additional processing steps, this may result in a loss of planarity between the devices. The above-described method may instead create multi-voltage planar discrete capacitor arrays by surrounding fully formed domains with through features while leaving enough substrate to keep the device stable. The through features may then be filled with ABF or other insulating material 190, with the remaining substrate 110 being removed during the final laser processing step leaving only the insulating material 190 to hold the device in place. In this way, multiple voltages may be used across different domains while maintaining the position of each domain with respect to other domains to facilitate embedding.

Figure 5:
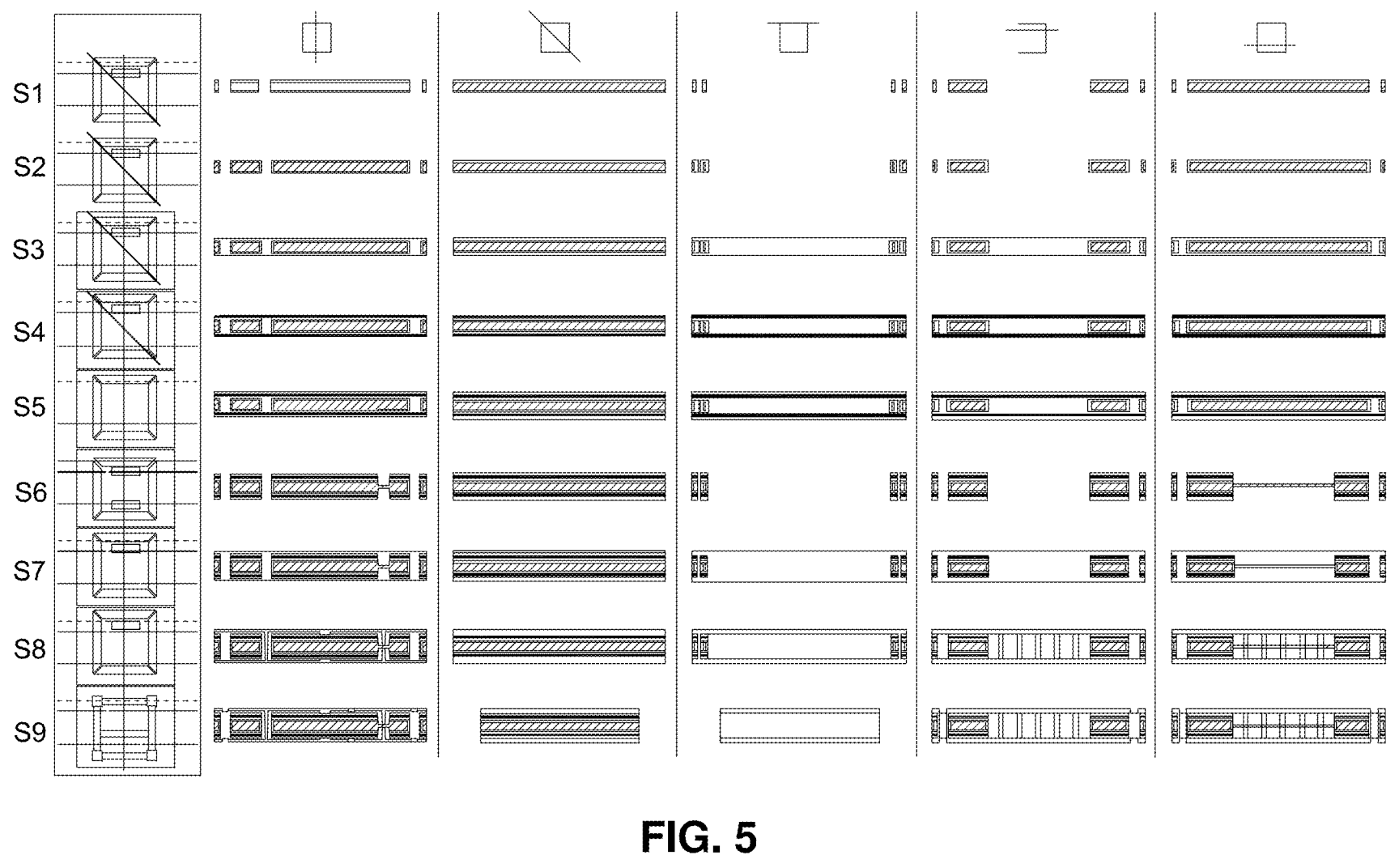

FIG. 5 is a detailed series of top and corresponding cross-sectional views of processing stages in manufacturing the capacitor 100, 300 (or a multi-voltage planar discrete capacitor array thereof) according to an embodiment of the present disclosure. As illustrated, the processing stages may include removal of bulk material from the conductive substrate 110 (S1), repair of dielectric layer 120 (S2), buildup of the conductive polymer layer 130 including filling of pre-drilled vias 160 (S3), buildup of the carbonaceous layer 170 (S4), addition of the metallization layer 180 such as TiCu physical vapor deposition (PVD) (S5), formation of blind and through vias 141, 161 as well as isolation trenches 163 (S6), application of ABF or other insulating material 190 (S7), via drill and fill and terminal metal application to connect metal contacts 140, 150 (S8), and terminal metal patterning 165, 166 (including through vias 164) for domain and device discretization (S9). It is noted that stage S2 of repairing the dielectric layer 120 may advantageously be omitted in the process of manufacturing the capacitor 300 including the re-drilled through via 161 (whereas the re-drilling of the pre-drilled via 160 may be omitted in the process of manufacturing the capacitor 100).

Throughout the above disclosure, the conductive substrate 110 and conductive polymer layer 130 acting as the first and second electrodes are described in several examples as being used as one or more anodes and one or more cathodes, respectively. However, the disclosure is not intended to be limited in this respect. For example, the conductive substrate 110 may serve as one or more cathodes and the conductive polymer layer 130 may serve as one or more anodes in some instances, depending on the particular application.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of making a capacitor, the method comprising:

providing a conductive substrate having a front side and a back side and having a dielectric layer formed on the front side and the back side;

drilling a via from the front side of the conductive substrate to the back side of the conductive substrate;

applying a conductive polymer layer on the dielectric layer, the conductive polymer layer extending from the front side to the back side of the conductive substrate through the via to fill the via;

producing a through via by removing the conductive polymer layer from the via to separate the conductive polymer layer into a front portion on the front side of the conductive substrate and a back portion on the back side of the conductive substrate, the front and back portions of the conductive polymer layer being electrically isolated from each other;

filling the through via with an insulating material;

removing a portion of the insulating material from the through via;

forming a first metal contact electrically connected to the conductive substrate; and forming a second metal contact electrically isolated from the first metal contact and electrically connected to the first and second portions of the conductive polymer layer by the through via.

2. The method of claim 1, wherein the conductive substrate comprises etched aluminum.

3. The method of claim 1, wherein the dielectric layer comprises aluminum oxide.

4. The method of claim 1, further comprising applying a carbonaceous layer on the conductive polymer layer, wherein said producing the through via is further performed by removing a portion of the carbonaceous layer.

5. The method of claim 1, further comprising applying a metallization layer on the conductive polymer layer, the second metal contact being electrically connected to the conductive polymer layer through the metallization layer, wherein said producing the through via is further performed by removing a portion of the metallization layer.

6. The method of claim 1, further comprising:

drilling one or more isolation trenches from the front side of the conductive substrate to the back side of the conductive substrate, wherein the conductive polymer extends from the front side to the backside of the conductive substrate through the one or more isolation trenches to fill the one or more isolation trenches;

reestablishing the one or more isolation trenches by removing the conductive polymer layer from the one or more isolation trenches; and filling the one or more reestablished isolation trenches with the insulating material.

7. The method of claim 6, further comprising removing a portion of the conductive substrate to leave the capacitor structurally connected only by the insulating material to an adjacent device formed on the same conductive substrate.

8. The method of claim 1, further comprising forming a blind via to reveal a portion of the conductive substrate, wherein the first metal contact is electrically connected to the conductive substrate via the blind via.

9. The method of claim 1, wherein the first and second metal contacts are formed on the front side of the conductive substrate.

10. The method of claim 9, wherein the first and second metal contacts are additionally formed on the back side of the conductive substrate.

* * * * *